United States Patent
Suzuki

(10) Patent No.: US 11,108,064 B2
(45) Date of Patent: Aug. 31, 2021

(54) FUEL CELL SYSTEM MOUNTED ON A VEHICLE

(71) Applicants: KABUSHIKI KAISHA TOYOTA JIDOSHOKKI, Kariya (JP); TOYOTA JIDOSHA KABUSHIKI KAISHA, Toyota (JP)

(72) Inventor: Hiroyuki Suzuki, Aichi-ken (JP)

(73) Assignees: KABUSHIKI KAISHA TOYOTA JIDOSHOKKI, Kariya (JP); TOYOTA JIDOSHA KABUSHIKI KAISHA, Toyota (JP)

(*) Notice: Subject to any disclaimer, the term of this patent is extended or adjusted under 35 U.S.C. 154(b) by 310 days.

(21) Appl. No.: 14/293,124

(22) Filed: Jun. 2, 2014

(65) Prior Publication Data

US 2014/0356746 A1 Dec. 4, 2014

(30) Foreign Application Priority Data

Jun. 3, 2013 (JP) .............................. JP2013-116789

(51) Int. Cl.
*H01M 8/04* (2016.01)
*H01M 8/04537* (2016.01)
*H01M 8/04746* (2016.01)

(52) U.S. Cl.
CPC ... *H01M 8/04559* (2013.01); *H01M 8/04753* (2013.01); *H01M 2250/20* (2013.01); *Y02T 90/40* (2013.01)

(58) Field of Classification Search
CPC ......... H01M 8/04559; H01M 2250/20; H01M 8/04753
See application file for complete search history.

(56) References Cited

U.S. PATENT DOCUMENTS

| | | | |
|---|---|---|---|
| 2007/0070654 A1* | 3/2007 | Liu | H01M 16/006 363/16 |
| 2010/0167141 A1* | 7/2010 | Son | H01M 8/04 429/429 |
| 2010/0261079 A1* | 10/2010 | Kells | H01M 8/04037 429/429 |
| 2012/0025619 A1* | 2/2012 | Lienkamp | H01M 8/04559 307/80 |

FOREIGN PATENT DOCUMENTS

| | | |
|---|---|---|
| JP | 2006-294458 A | 10/2006 |
| JP | 2007-109569 A | 4/2007 |
| JP | 2007109569 A * | 4/2007 |
| JP | 2010-129293 A | 6/2010 |
| JP | 2013-105533 A | 5/2013 |
| WO | 2012/035974 A1 | 3/2012 |

OTHER PUBLICATIONS

Goto, Machine translation of JP 2007109569 A, Apr. 2007, Japan.*

* cited by examiner

*Primary Examiner* — Sarah A. Slifka
*Assistant Examiner* — Brent C Thomas
(74) *Attorney, Agent, or Firm* — Sughrue Mion, PLLC

(57) ABSTRACT

A fuel cell system mounted on a vehicle is provided. During intermittent operation of the fuel cell system, if a cell voltage Vc of a fuel cell stack becomes lower than a predetermined threshold voltage V', an air compressor is operated to supply air to the fuel cell stack at a first predetermined flow rate, and when the cell voltage Vc reaches and stabilizes at a predetermined target voltage V'', air is supplied to the fuel cell stack at a second predetermined flow rate that is higher than the first predetermined flow rate for a certain period of time.

8 Claims, 3 Drawing Sheets

FUEL CELL SYSTEM MOUNTED ON A VEHICLE

BACKGROUND OF THE INVENTION

1. Field of the Invention

The present invention relates to a fuel cell system mounted on a vehicle, and more particularly, to a fuel cell system mounted on a vehicle that performs intermittent operation.

2. Description of the Related Art

Vehicles having a fuel cell system are coming into practical use. In a typical fuel cell system, hydrogen gas and air are supplied to a fuel cell stack constructed by stacking a plurality of power generating cells, and these hydrogen gas and oxygen in the air chemically react inside the power generating cells. In this manner, electric power is generated.

Hitherto, in order to improve the fuel economy of the fuel cell system, an operating method called "intermittent operation" is employed. In intermittent operation, during low load operation of a vehicle such as during idling or low speed driving, supply of air to the fuel cell stack is stopped to suspend the electric power generation, and the electric power required by the vehicle is supplied by a battery. However, if the supply of air to the fuel cell stack is stopped for a long time, the voltages of the power generating cells (cell voltages) gradually decrease, and eventually, the cell voltages become lower than a minimum voltage (minimum allowable voltage) which is the lowest voltage that will not cause deterioration of the power generating cells.

JPA 2007-109569 discloses an invention in which, in order to prevent excessive decrease of the cell voltages during the intermittent operation, when the cell voltages become lower than a predetermined threshold voltage, air is temporarily supplied to the fuel cell stack to generate electric power, thereby maintaining the cells at a voltage higher than a certain voltage (see FIG. 6 of JPA 2007-109569).

However, in the invention disclosed in JPA 2007-109569, the supply of air to the fuel cell stack is abruptly started, and hence the cell voltages abruptly increase. Therefore, the cell voltages may exceed a maximum allowable voltage which is the highest voltage that will not cause deterioration of the power generating cells. Further, if air is gently supplied in order to prevent the cell voltages from increasing abruptly, the air inside the fuel cell stack will be uneven, and hence the voltages of the cells will be uneven.

SUMMARY OF THE INVENTION

The present invention has been made to solve the above problems, and the aim of the invention is to provide a fuel cell system mounted on a vehicle, which prevents the cell voltages of the fuel cell stack from exceeding the maximum allowable voltage while keeping the cell voltages uniform during the intermittent operation of the fuel cell system.

In order to solve the above problems, there is provided a fuel cell system mounted on a vehicle, the fuel cell system comprising: a fuel cell stack constructed by stacking a plurality of power generating cells; hydrogen supply means for supplying hydrogen gas to the fuel cell stack; air supply means for supplying air containing oxygen to the fuel cell stack; voltage detection means for detecting a cell voltage of the fuel cell stack; and control means for controlling an operation of the air supply means based on the cell voltage of the fuel cell stack detected by the voltage detection means, wherein during an intermittent operation of the fuel cell system, if the cell voltage detected by the voltage detection means becomes lower than a predetermined threshold voltage, the control means controls the air supply means to supply the air to the fuel cell stack at a first predetermined flow rate, and when the cell voltage reaches and stabilizes at a predetermined target voltage, the control means then controls the air supply means to supply the air to the fuel cell stack at a second predetermined flow rate that is higher than the first predetermined flow rate for a certain period of time.

DETAILED DESCRIPTION OF THE PREFERRED EMBODIMENT

Hereafter, an embodiment of the present invention is described with reference to the attached drawings.

Embodiment

Figure 1:
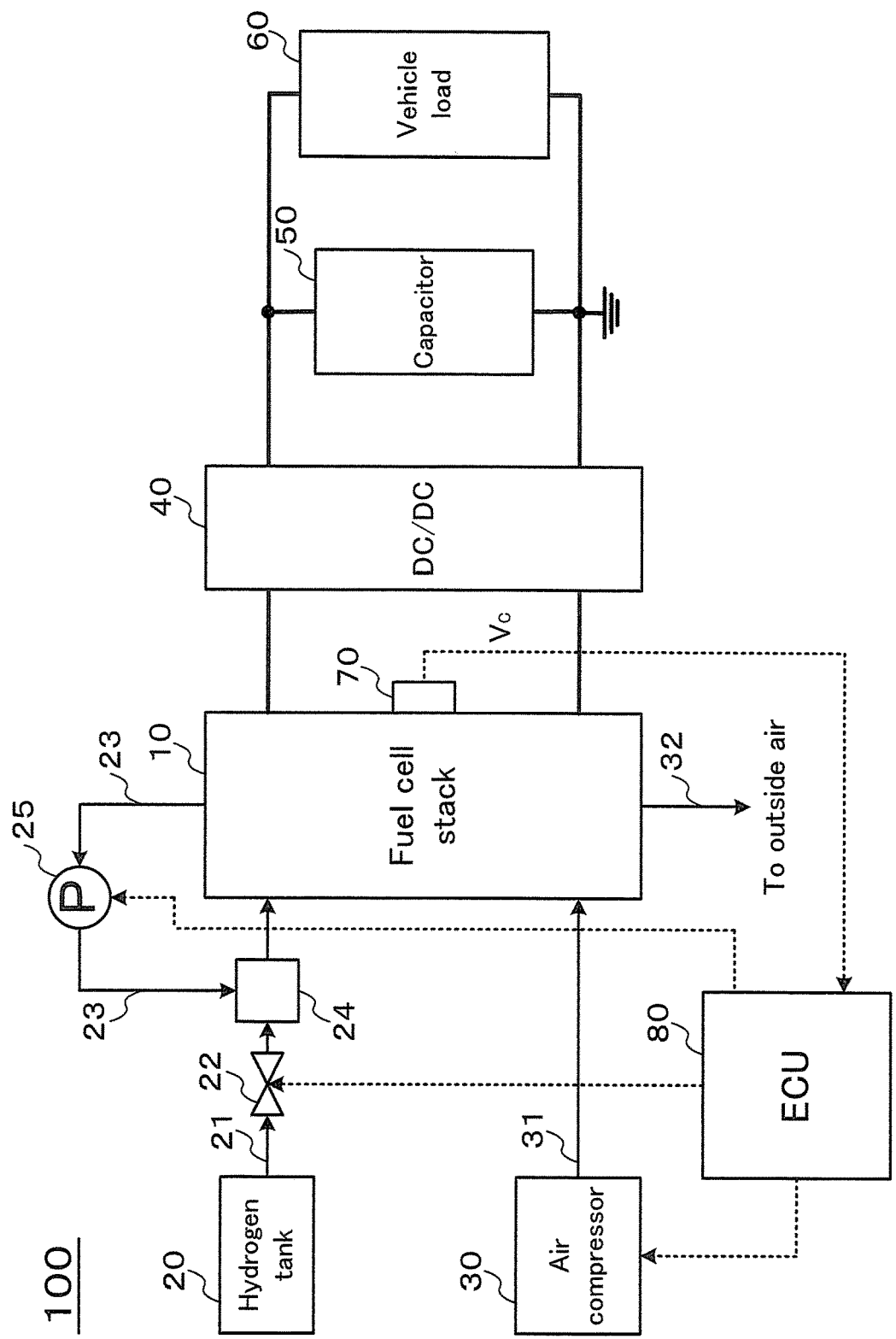
FIG. 1 illustrates a configuration of a fuel cell system mounted on a vehicle according to an embodiment of the present invention.

FIG. 1 illustrates a configuration of a fuel cell system 100 mounted on a vehicle according to the embodiment of the present invention. In the description below, the fuel cell system 100 is described as being mounted on an industrial vehicle, such as a forklift, which has a loading device.

The fuel cell system 100 comprises a fuel cell stack 10, a hydrogen tank 20 capable of supplying hydrogen gas, and an air compressor 30 capable of supplying air containing oxygen. The fuel cell stack 10 has a structure of a plurality of stacked power generating cells. Each power generating cell is formed by interposing a solid polymer electrolyte between an anode electrode (hydrogen electrode) and a cathode electrode (air electrode). The hydrogen gas is supplied to the anode electrodes of the power generating cells and the air is supplied to the cathode electrodes of the power generating cells. Inside the power generating cells, electrical energy is generated by chemical reaction between the hydrogen gas and the oxygen in the air. In this manner, electric power generation of the fuel cell stack 10 is performed.

At the middle of a hydrogen supply pipe 21 between the hydrogen tank 20 and the fuel cell stack 10, a flow rate adjusting valve 22 including an injector and an ejector 24 connected to a hydrogen reflux pipe 23 are provided. The flow rate adjusting valve 22 adjusts the flow rate of the hydrogen gas to be supplied to the fuel cell stack 10. At the middle of the hydrogen reflux pipe 23, a motor pump 25 is provided.

The hydrogen gas supplied to the fuel cell stack 10 from the hydrogen tank 20 through the hydrogen supply pipe 21 is partially consumed by the chemical reaction inside the fuel cell stack 10. The remaining hydrogen gas not consumed by the chemical reaction is discharged into the hydrogen reflux pipe 23, guided into the ejector 24 by the operation of the motor pump 25 and supplied to the fuel cell stack 10 again.

On the other hand, the air supplied to the fuel cell stack 10 by the air compressor 30 through an air supply pipe 31 is partially consumed by the chemical reaction inside the fuel cell stack 10. The remaining air not consumed by the chemical reaction is discharged into an air exhaust pipe 32 and emitted to the outside air through an exhaust path (not shown).

Further, the output of the fuel cell stack 10 is connected to a DC/DC converter 40, and the output of the DC/DC converter 40 is connected to a capacitor 50 and a vehicle load 60. The DC electric power output from the fuel cell stack 10 is stepped down to a predetermined voltage by the DC/DC converter 40, and is then supplied to the vehicle load 60 including a load motor, a drive motor, and the like. In this case, when the electric power generated by the fuel cell stack 10 exceeds the electric power required by the vehicle load 60, the surplus power is charged into the capacitor 50. On the other hand, when the generated power is less than the required power, power is supplied from the capacitor 50 to the vehicle load 60 to make up for the insufficient portion.

A voltage sensor 70 for detecting a cell voltage Vc of the fuel cell stack 10 (more exactly, an average value of the cell voltages of the plurality of power generating cells of the fuel cell stack 10) is also attached to the fuel cell stack 10. The output of the voltage sensor 70 is input to an electronic control unit (ECU) 80.

The ECU 80 is constructed of a microcomputer. The ECU 80 controls the opening and closing of the flow rate adjusting valve 22 and the rotational speed of the motor pump 25 to adjust the flow rate of the hydrogen gas to be supplied to the fuel cell stack 10, and controls the discharge flow rate of the air compressor 30 to adjust the flow rate of the air to be supplied to the fuel cell stack 10. In this manner, the electric power generated by the fuel cell stack 10 is controlled. Further, when the intermittent operation of the fuel cell system 100 is performed, the ECU 80 controls the air compressor 30 based on the cell voltage Vc of the fuel cell stack 10 detected by the voltage sensor 70, thereby preventing deterioration of the power generating cells of the fuel cell stack 10.

Next, an operation of the fuel cell system 100 mounted on the vehicle during the intermittent operation according to the embodiment is described. During the intermittent operation of the fuel cell system 100, the air compressor 30 is normally in a suspended state, and hence the supply of air to the fuel cell stack 10 is stopped. On the other hand, during the intermittent operation, the flow rate adjusting valve 22 is normally in a closed state and is in an opened state if the pressure of the hydrogen decreases, and the motor pump 25 operates at low speed, and hence the supply of a small amount of hydrogen gas to the fuel cell stack 10 is continued. In such a situation, the ECU 80 executes a procedure illustrated in the control flow of FIG. 2 with a predetermined time interval.

Figure 2:
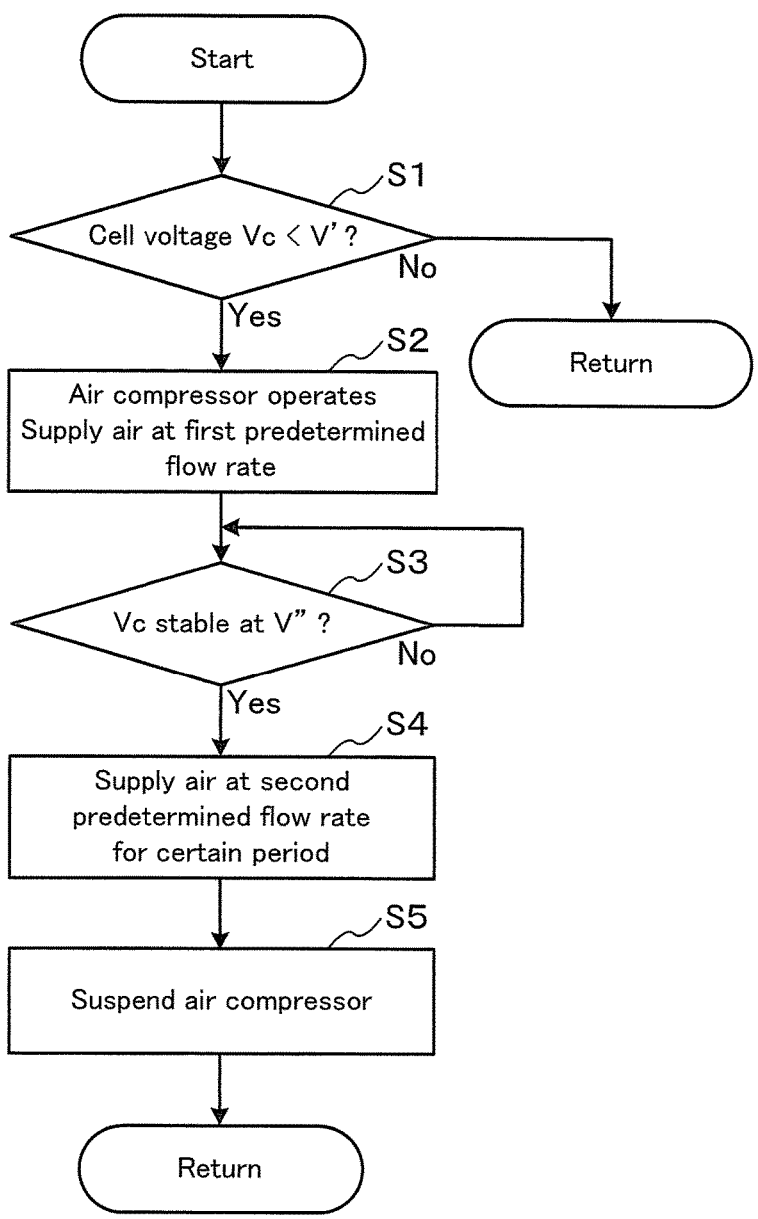
FIG. 2 illustrates a flowchart of an operation of the fuel cell system during an intermittent operation according to an embodiment of the present invention.

Referring to the control flow of FIG. 2, the ECU 80, at Step S1, determines whether the cell voltage Vc of the fuel cell stack 10 detected by the voltage sensor 70 is lower than a predetermined threshold voltage V'. The predetermined threshold voltage V' is a voltage set to be slightly higher than a minimum voltage (minimum allowable voltage: Vmin) which is the lowest voltage that will not cause deterioration of the power generating cells of the fuel cell stack 10.

If the cell voltage Vc is lower than the threshold voltage V', the ECU 80, at Step S2, controls the air compressor 30 to operate at a minimum discharge flow rate that is allowable under the specifications. As a result, as shown at a time T1 of the timing chart of FIG. 3A, the air is supplied to the fuel cell stack 10 at a first predetermined flow rate (minimum discharge flow rate).

Figure 3:
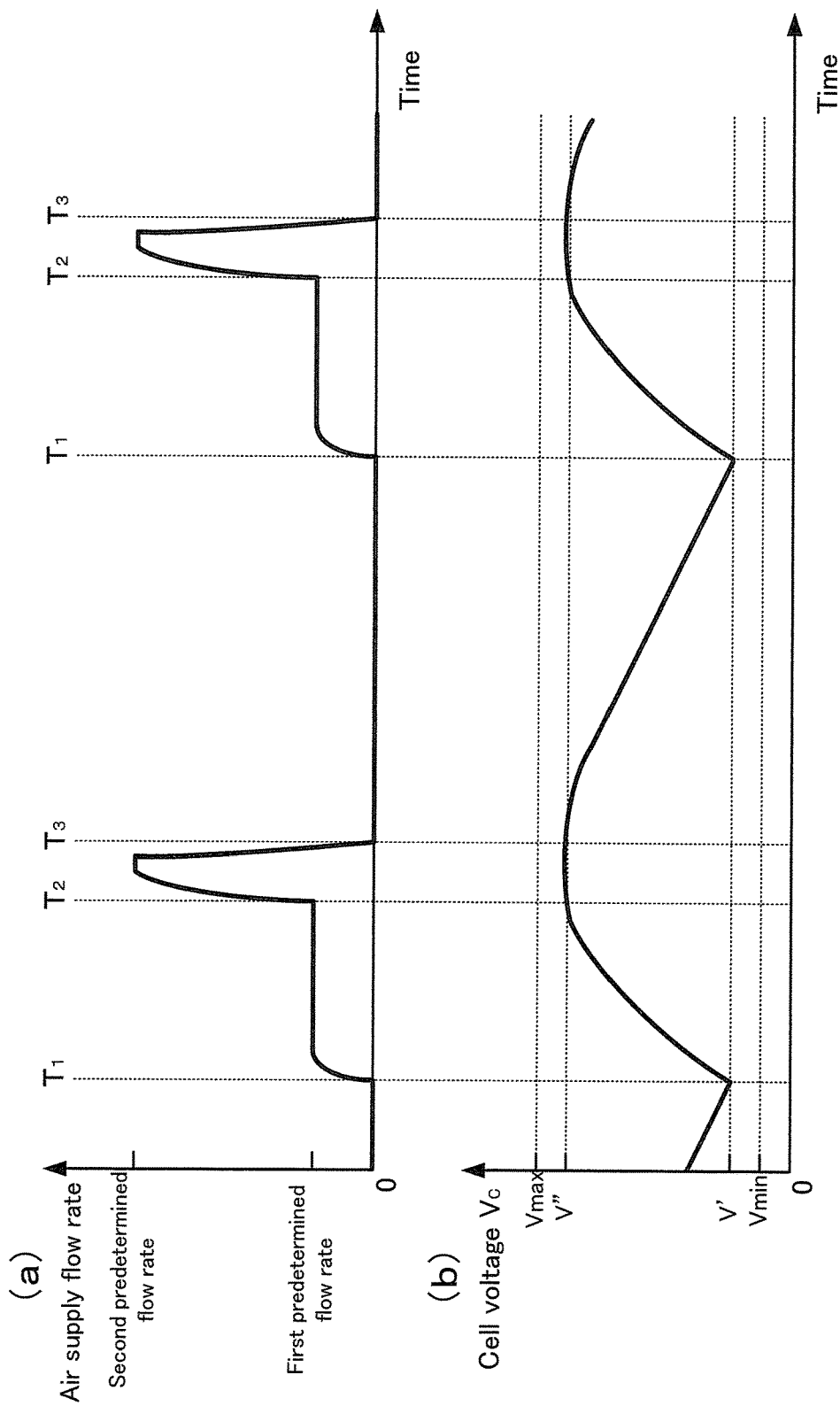
FIGS. 3A and 3B illustrate timing charts showing a relationship between the cell voltage and flow rate of air supplied to a fuel cell stack of the fuel cell system during the intermittent operation according to an embodiment of the present invention.

Subsequently, at Step S3, the ECU 80 continues the operation of the air compressor 30 until the cell voltage Vc of the fuel cell stack 10 reaches and stabilizes at a target voltage V". The target voltage V" is set to be slightly lower than a maximum voltage (maximum allowable voltage: Vmax) which is the highest voltage that will not cause deterioration of the power generating cells (times T1 to T2 of FIG. 3A). During this period, the electric power is generated inside the fuel cell stack 10 by the chemical reaction between the hydrogen supplied from the hydrogen tank 20 and the oxygen in the air supplied by the air compressor 30 so that the cell voltage Vc gradually increases as shown in FIG. 3B. At this time, as described above, the air is gently supplied with the minimum discharge flow rate of the air compressor 30, and hence the cell voltage Vc does not abruptly rise to exceed the maximum allowable voltage Vmax.

When the cell voltage Vc reaches and stabilizes at the target voltage V", the ECU 80, at Step S4, adjusts the discharge flow rate of the air compressor 30 so as to increase the flow rate of the air to be supplied to the fuel cell stack 10 to a second predetermined flow rate that is higher than the above first predetermined flow rate. The air compressor 30 supplies the air at the second predetermined flow rate for a certain period of time (times T2 to T3 of FIG. 3B). The second predetermined flow rate is set to a flow rate that is necessary to operate the fuel cell system 100 at a minimum output state. This flow rate of the air is sufficient for blowing off water inside the fuel cell stack 10 and hence eliminates the unevenness of the cell voltages. As a result, the water inside the fuel cell stack 10 is blown off and unevenness of the air is eliminated, thereby eliminating the unevenness of the cell voltages.

Also, in this embodiment, the total sum of the air supplied at the first predetermined flow rate at Steps S2 and S3 and the air supplied at the second predetermined flow rate at Step S4 is set to be larger than the total sum of capacities of the anodes of the power generating cells of the fuel cell stack 10. With this, the air inside the fuel cell stack 10 is completely replaced during the period of times T1 to T3.

Finally, at step S5, the ECU 80 suspends the operation of the air compressor 30. As a result, the supply of the air to the fuel cell stack 10 is stopped as shown at the time T3 of FIG. 3A, and hence the electric power generation of the fuel cell stack 10 is suspended. The cell voltage Vc gradually decreases as shown in FIG. 3B.

As described above, in the fuel cell system 100 according to the embodiment, during the intermittent operation of the fuel cell system 100, if the cell voltage Vc of the fuel cell stack 10 becomes lower than the predetermined threshold voltage V', the air compressor 30 is operated to supply the air to the fuel cell stack 10 at the first predetermined flow rate, and when the cell voltage Vc reaches and stabilizes at the predetermined target voltage V", the air is supplied to the fuel cell stack 10 at the second predetermined flow rate that is higher than the first predetermined flow rate for the certain period of time. In this manner, during the intermittent operation of the fuel cell system 100, the cell voltages of the fuel cell stack 10 are prevented from exceeding the maximum allowable voltage Vmax while the cell voltages are kept uniform.

OTHER EMBODIMENTS

In the above embodiment, the cell voltage Vc is defined by the average value of the cell voltages of the plurality of power generating cells of the fuel cell stack 10. However, for example, in the flowchart of FIG. 2, the cell voltage Vc may be defined by a minimum value of the cell voltages at Step S2, and by a maximum value of the cell voltages at Step S3.

Further, in the above embodiment, the flow rate of the air supplied to the fuel cell stack 10 is controlled in two steps, such as the first predetermined flow rate and the second predetermined flow rate. However, the flow rate of the air may be controlled in three steps or more.

What is claimed is:

1. A fuel cell system mounted on a vehicle, the fuel cell system comprising:
   a fuel cell stack constructed by stacking a plurality of power generating cells;
   a hydrogen tank that supplies hydrogen gas to the fuel cell stack;
   an air compressor that supplies air containing oxygen to the fuel cell stack;
   a voltage sensor that detects a cell voltage of the fuel cell stack; and
   a microcomputer configured to control an operation of the air compressor based on the cell voltage of the fuel cell stack detected by the voltage sensor,
   wherein the microcomputer is configured to, during a low load operation of the vehicle and an intermittent operation of the fuel cell system while the fuel cell stack is connected to a motor of the vehicle,
      based upon the cell voltage detected by the voltage sensor becoming lower than a predetermined threshold voltage, control the air compressor to supply the air to the fuel cell stack at a first predetermined flow rate until the cell voltage of the fuel cell stack reaches and stabilizes at a predetermined target voltage that is greater than the predetermined threshold voltage, and
      when the cell voltage reaches and becomes continuously stabilized at the predetermined target voltage, control the air compressor to supply the air to the fuel cell stack at a second predetermined flow rate that is higher than the first predetermined flow rate for a certain period of time,
   wherein the first predetermined flow rate is a minimum flow rate that the air compressor can supply,
   wherein the predetermined threshold voltage and the predetermined target voltage are set to be higher than zero volts, and
   wherein the low load operation of the vehicle is a driving operation of the vehicle in which the vehicle moves.

2. A fuel cell system mounted on a vehicle, the fuel cell system comprising:
   a fuel cell stack constructed by stacking a plurality of power generating cells;
   a hydrogen tank that supplies hydrogen gas to the fuel cell stack;
   an air compressor that supplies air containing oxygen to the fuel cell stack;
   a voltage sensor that detects a cell voltage of the fuel cell stack; and
   a microcomputer configured to control an operation of the air compressor based on the cell voltage of the fuel cell stack detected by the voltage sensor,
   wherein the microcomputer is configured to, during a low load operation of the vehicle and an intermittent operation of the fuel cell system while the fuel cell stack is connected to a motor of the vehicle,
      based upon the cell voltage detected by the voltage sensor becoming lower than a predetermined threshold voltage, control the air compressor to supply the air to the fuel cell stack at a first predetermined flow rate until the cell voltage of the fuel cell stack reaches and stabilizes at a predetermined target voltage that is greater than the predetermined threshold voltage, and
      when the cell voltage reaches and becomes continuously stabilized at the predetermined target voltage, control the air compressor to supply the air to the fuel cell stack at a second predetermined flow rate that is higher than the first predetermined flow rate for a certain period of time,
   wherein the second predetermined flow rate is a flow rate that is necessary to operate the fuel cell system at a minimum output state,
   wherein the predetermined threshold voltage and the predetermined target voltage are set to be higher than zero volts, and
   wherein the low load operation of the vehicle is a driving operation of the vehicle in which the vehicle moves.

3. A fuel cell system mounted on a vehicle, the fuel cell system comprising:
   a fuel cell stack constructed by stacking a plurality of power generating cells;
   a hydrogen tank that supplies hydrogen gas to the fuel cell stack;
   an air compressor that supplies air containing oxygen to the fuel cell stack;
   a voltage sensor that detects a cell voltage of the fuel cell stack; and
   a microcomputer configured to control an operation of the air compressor based on the cell voltage of the fuel cell stack detected by the voltage sensor,
   wherein the microcomputer is configured to, during a low load operation of the vehicle and an intermittent operation of the fuel cell system while the fuel cell stack is connected to a motor of the vehicle,
      based upon the cell voltage detected by the voltage sensor becoming lower than a predetermined threshold voltage, control the air compressor to supply the air to the fuel cell stack at a first predetermined flow rate until the cell voltage of the fuel cell stack reaches and stabilizes at a predetermined target voltage that is greater than the predetermined threshold voltage, and
      when the cell voltage reaches and becomes continuously stabilized at the predetermined target voltage, control the air compressor to supply the air to the fuel cell stack at a second predetermined flow rate that is higher than the first predetermined flow rate for a certain period of time,
   wherein, during the intermittent operation of the fuel cell system, the microcomputer is configured to cause a total sum of the air that has been flowed over a set amount of time supplied at the first predetermined flow rate and the air that has been flowed over another set amount of time supplied at the second predetermined flow rate by the air compressor to be larger than a total sum of capacities of anodes of the plurality of power generating cells of the fuel cell stack, and wherein the predetermined threshold voltage and the predetermined target voltage are set to be higher than zero volts, and wherein the low load operation of the vehicle is a driving operation of the vehicle in which the vehicle moves.

4. The fuel cell system according to claim 1, wherein the second predetermined flow rate is a flow rate that is necessary to operate the fuel cell system at a minimum output state.

5. The fuel cell system according to claim 1, wherein the predetermined threshold voltage is a voltage higher than a minimum voltage which will not cause deterioration of the plurality of power generating cells.

6. The fuel cell system according to claim 1, wherein the microcomputer is configured to perform the control of the air compressor to supply the air to the fuel cell stack at the first predetermined flow rate and the second predetermined flow rate while an anode of the fuel cell stack and a cathode of the fuel cell stack are in a non-short circuited state.

7. The fuel cell system according to claim 2, wherein the microcomputer is configured to perform the control of the air compressor to supply the air to the fuel cell stack at the first predetermined flow rate and the second predetermined flow rate while an anode of the fuel cell stack and a cathode of the fuel cell stack are in a non-short circuited state.

8. The fuel cell system according to claim 3, wherein the microcomputer is configured to perform the control of the air compressor to supply the air to the fuel cell stack at the first predetermined flow rate and the second predetermined flow rate while an anode of the fuel cell stack and a cathode of the fuel cell stack are in a non-short circuited state.

* * * * *